United States Patent
Zito, Jr.

[15] 3,640,771
[45] Feb. 8, 1972

[54] METAL BROMIDE BATTERY

[72] Inventor: Ralph Zito, Jr., Westford, Mass.
[73] Assignee: The Zito Company, Inc., Derry, N.H.
[22] Filed: Oct. 20, 1969
[21] Appl. No.: 867,609

[52] U.S. Cl. ................................................. 136/6, 136/30
[51] Int. Cl. ............................................................ H01m 35/00
[58] Field of Search ............... 136/6, 83, 86, 30, 154, 155, 136/100, 121–122, 22, 103

[56] References Cited

UNITED STATES PATENTS

| | | | |
|---|---|---|---|
| 3,328,202 | 6/1967 | Riffe | 136/30 X |
| 3,382,102 | 5/1968 | Zito, Jr. | 136/30 |
| 2,853,444 | 9/1958 | Pye et al. | 204/108 |
| 3,285,781 | 11/1966 | Zito, Jr. | 136/6 X |
| 3,408,232 | 10/1968 | Blue et al. | 136/30 |

Primary Examiner—Anthony Skapars
Attorney—E. H. Kent

[57] ABSTRACT

A secondary battery comprising an anode, a cathode including a bromine-adsorbent layer capable of adsorbing at least half its weight of molecular bromine when the battery is charged, and an electrolyte comprising a divalent electroplatable metal bromide salt dissolved in an aqueous medium, the amount of said salt being such that, when the battery is in the charged state, the electrolyte comprises less than about 0.0005 moles/ml. of dissolved metal bromide salt and less than about 0.02 gms/ml. of molecular bromine.

4 Claims, 3 Drawing Figures

FIG. 1
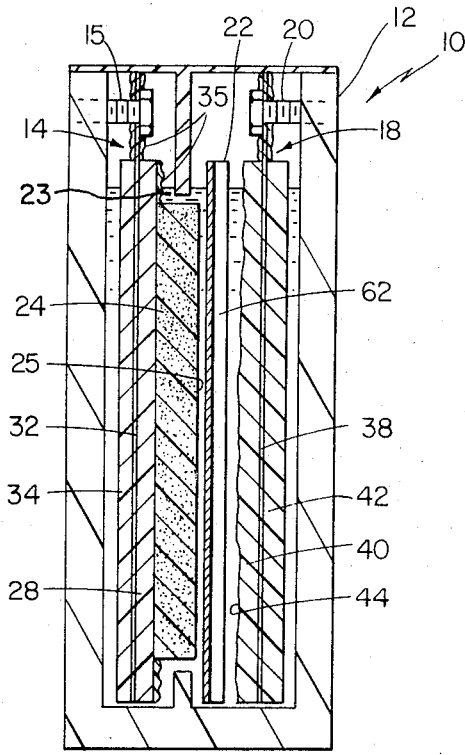
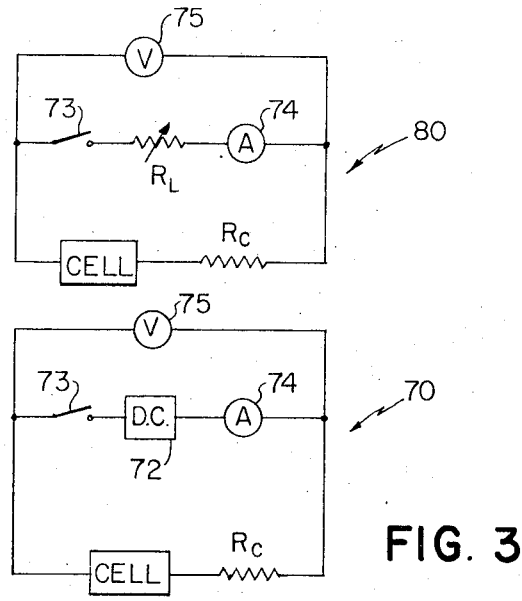
FIG. 3
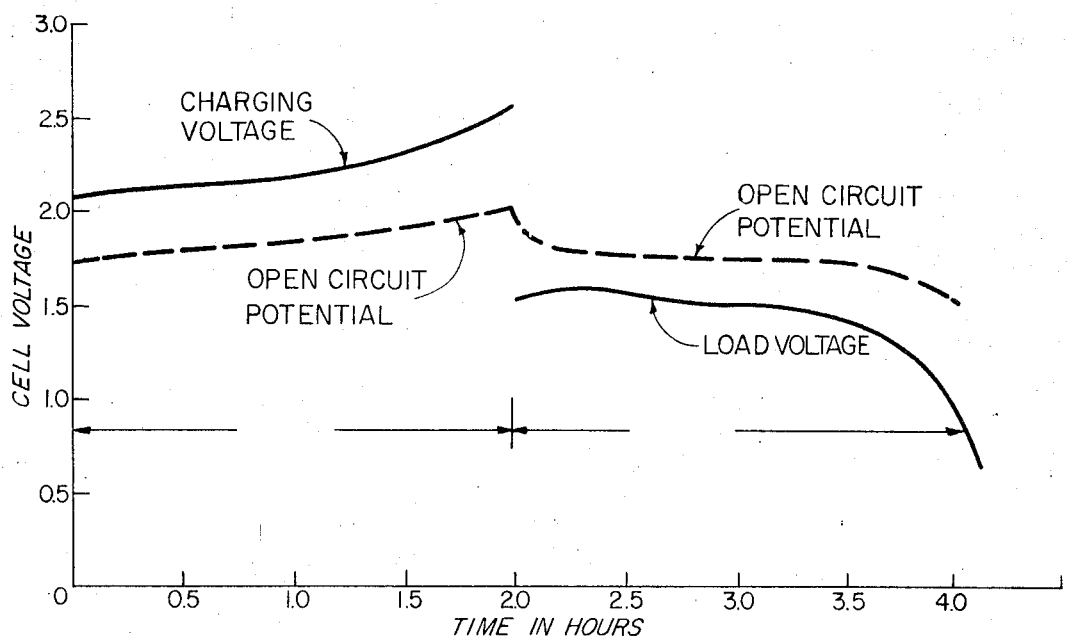
FIG. 2

METAL BROMIDE BATTERY

This invention relates to secondary batteries and battery components, and particularly to metal bromide batteries.

An object of this invention is to provide an inexpensive, rechargeable, reliable battery which may be overcharged without substantial loss of useful life and without substantially disturbing the repeated uniformity of successive battery discharge cycles.

Another object is to improve metal bromide batteries by reducing handling difficulties attendant on bromine, avoiding local bromine concentrations, improving the uniformity of electroplated metal (thereby reducing the dangers of battery shorting due to excessive metal dendrite growth), and affording maximum utilization of electrolyte-interacting anode and cathode services.

Another object is to provide a rechargeable battery capable of monitoring its own charging cycle and signaling when full charge is reached.

A further object is to provide safe, economical, and simple zinc bromide batteries.

The invention features a secondary battery comprising an anode, a cathode including a bromine-adsorbent layer capable of adsorbing at least half its weight of molecular bromine when the battery is charged, and an electrolyte comprising a divalent electroplatable metal bromide salt dissolved in an aqueous medium, the amount of said salt being such that, when the battery is in the charged state, the electrolyte comprises less than about 0.0005 moles/ml. of dissolved metal bromide salt and less than about 0.02 g./ml. of molecular bromine.

In a preferred embodiment, the bromine-adsorbent is activated carbon (e.g., coconut charcoal or a synthetic equivalent), the metal salt is zinc bromide, and the electrolyte includes a "brightener."

Other objects, features, and advantages of the invention will be apparent from the following description of a preferred embodiment of the invention, taken together with the attached drawings thereof, in which:

FIG. 1 is a schematic sectional view of a battery in which the present invention is employed; and, FIG. 2 is a series of curves illustrating the charge and discharge characteristics of a battery constructed in accordance with the present invention; and FIG. 3 shows two circuit diagrams illustrating the measurement of load voltage and open cell potential during the charge and discharge cycles of the battery.

FIG. 1 shows a single-cell battery 10 having an outer case 12, a cathode 14 electrically connected to cathode terminal screw 15, an anode 18 electrically connected to anode terminal screw 20, a porous separator 22 and a liquid electrolyte medium 23.

End cathode 14 includes a bromine-adsorbent (e.g., activated carbon) layer 24, substantially inert to bromine, having an extended surface 25 in contact with electrolyte 23, and bonded, along its opposite surface, to electroconductive barrier layer 28, which is also substantially inert to bromine. Externally connectable electroconducting member 32 may be a perforated metal member (e.g., a screen) (in which event barrier layer 28 must also be bromine and electrolyte impermeable), or a nonmetallic electroconductive member (e.g., a highly electroconductive carbon sheet, available under the trade-name "Grafoil" from Union Carbide Co.). Conducting member 32 is laminated between barrier layer 28 and a protective layer 34, with the two layers bonded to one another through apertures in the conducting member. Protective layer 34 is substantially inert to bromine and, where member 32 is corrodible (e.g. metal), is also bromine and electrolyte impermeable. Exposed portions of barrier layer 28 and member 32 may be coated with a protective film, 35, which is also substantially inert to bromine (and impermeable to bromine and electrolyte, if member 32 is corrodible) and is an electrical insulator.

Anode 18 has an externally connectable electroconducting member 38 laminated between an anode barrier layer 40 and an anode protective layer 42, which have properties identical, respectively, to electroconducting member 32, barrier layer 28, and protective layer 34. Anode barrier layer 40 has a roughened surface 44 (e.g., sandblasted) in contact with the electrolyte providing a metal electroplating surface.

Porous separator 22 has spaced vertical ribs 62, and is located between anode surface 44 and extended cathode surface 25 to retard the tendency of bromine molecules to migrate to the anode, thereby improving the charge retentivity of the battery. A useful separator is a porous (pores in the range of 5 to 20 microns in diameter) polymethylene separator, structured as shown in FIG. 1, having a thickness of about one thirty-second mils. Dialysis membranes (e.g., having pore sizes in the order of 50 angstroms) are also useful.

The total interface resistance of the cathode or anode, per square inch of electrolyte-contacting area, is not greater than about 0.05 ohms.

Each barrier layer is sufficiently electroconductive to conduct electricity between the conducting member 32 or 38 and the electrolyte, and comprises, e.g., highly electroconductive carbon particles (e.g., graphite or carbon black), adhered into an integral layer by a bonding agent. Useful bonding agents include the polyfluorocarbons, such as polytetrafluoroethylene ("Teflon," available from E. I. du Pont de Nemours & Co.), poly (vinylidene fluoride) ("Kynar," available from Penwalt Co.), polymonochlorotrifluoroethylene ("CTFE," available from Allied Chemical Co.), and "FEP," a fluorinated polyethylene available from the same du Pont; poly (vinyl chloride) homopolymers (plasticized or unplasticized) (e.g., "Geon 222," available from B. F. Goodrich Co.); poly (vinylidene chloride) homopolymers and copolymers (50 percent or greater vinylidene chloride) such as acrylonitrile and vinyl chloride copolymers (available generally under the trade name "Saran" from Dow Chemical Co.); polymethacrylates such as poly (methyl methacrylate) ("Plexiglas," available from Rohm & Haas Co.); polyethylene; and polypropylene. Where member 32 or 38 is corrodible, the bonding agent should be bromine and electrolyte impermeable (i.e., should not be polyethylene or polypropylene).

The bromine-adsorbent layer is composed of a bromine adsorbent, such as activated carbon (coconut charcoal or a synthetic equivalent) particles, bonded together by a bromine-inert bonding agent such as any of those listed above, including the bromine-permeable bonding agents such as polyethylene and polypropylene, and is adhered to the barrier layer.

Both layers may be prepared by conventional methods, such as by admixing the polymeric bonding agent and carbon particles in a liquid medium which is thereafter evaporated, or by sintering, or by molding.

The electrolyte includes an aqueous medium having a dissolved salt of bromine and a divalent electroplatable metal which is electrolyzed during the charging cycle of the battery (i.e., by connecting a voltage source across the battery to terminal screws 15 and 20), the metal electroplating on the anode electroplating surfaces and the bromide forming molecular bromine, which is substantially entrapped within the bromine-adsorbent layer. The bromine-adsorbent activated carbon layer forms bonds with bromine molecules of sufficient energy to keep the bromine molecules near the cathode during charging and charged periods, yet of low enough energy so as not to interfere with ionization of bromine during the discharge cycle.

In general, the divalent electroplatable metal should be repeatedly electroplatable and must not be corroded in the liquid electrolyte medium, and the metal bromide salt must be sufficiently soluble in the liquid medium to be electroplatable. Where an aqueous liquid medium is employed, among the useful metals are, e.g., zinc, nickel, cadmium, tin (stannous), lead, and copper (cupric).

A preferred electrolyte is zinc bromide in an aqueous solution. This salt has a reasonably high potential of 1.83 volts, is highly soluble in water to provide a low resistivity electrolyte, and has a calculated free energy per pound of about 200 watt-hours. Preferably the electrolyte includes a "brightener" which is inert to bromine to enhance the uniformity of zinc deposition on the anode. Exemplary "brighteners" include polyethylene oxide, polyalkylene glycols, poly (vinyl alkyl ethers) and suitable copolymers thereof.

The amount of the divalent metal bromide salt forming the electrolyte (i.e., the amount of salt used to form an electrolyte solution during assembly of the battery components) should be such that, when the battery has reached full charge, the amount of the remaining dissolved metal bromide salt is less than about 0.0005 moles/ml. and the total free bromine in the electrolyte is less than about 0.02 g./ml. The remaining bromine is, of course, adsorbed in the adsorbent layer. The amount of adsorbent used (i.e., the size of the adsorbent layer) depends on the size desired for the battery as well as the desired watt-hour output. The bromine adsorptivity of the particular adsorbent may be determined conveniently by immersing the adsorbent, formed into a layer, into a mixture of liquid bromine and an electrolyte (containing the bromine salt to be utilized in the battery), and measuring the bromine uptake at intervals by determining the amount of free bromine left in an aliquot portion of the mixture. In general, activated carbon (coconut charcoal or a synthetic equivalent) particles adsorb bromine in the range of about one gram of bromine per gram of carbon, and, when bonded into an adsorbent layer, the adsorptivity is still greater than about 0.5 g./g. The rate of adsorptivity may be somewhat less in the battery than in the bromine-electrolyte mixture, because substantially no free bromine is present in the battery at the beginning of the charging cycle.

FIG. 2 shows charge and discharge curves for a battery utilizing a 90 percent polyethylene (FN-510, available from U.S. Indus. Chem. Co.)-10 percent active carbon (Barnaby Cheney UU grade) adsorptive layer (having a total weight of 24 grams), a "Grafoil" conducting member, and a 43 percent polyethylene-57 percent graphite (Dixon graphite Dixon No. 1112) barrier layer. The total electrolyte volume, 65–70 cc., of which about 25–30 cc. (catholyte) was in the adsorptive layer, included 30 g. of zinc bromide, and 0.010 to 0.020 g. of a polyethylene oxide ("Polyox WRS 205," available from Union Carbide Co.) brightener, and weighed about 80 to 95 g. The total cell weight was 120–140 g.

To form the electrodes, 15 g. of polyethylene (FN-510 powder, manufactured by U.S. Indus. Chem. Co.) and 20 g. Dixon 1112 graphite, after being mixed together in a blender, were placed into a 6"×9"×⅛" mold, heated for 2 minutes at 250° F., compressed under 30 tons for 5 minutes at 250° F., and cooled in a mold under 30 tons compression to form a polyethylene-graphite reinforcement layer.

A 6½"×4" sheet of "Grafoil" was immersed as anode to a level of 1½ in. in a 3 molar zinc bromide electrolyte (containing, also, 1.5 g. of polyoxyethylene brightener per 100 mil. of water in the electrolyte), with a 4"×8" piece of zinc as anode. The resultant cell was charged at 1 amp for 10 minutes, and the zinc-electroplated "Grafoil" removed, rinsed, and air dried. A 4"×2" sheet of copper screen was then soldered to the Grafoil, with the screen overlapping the plated end of the "Grafoil" by about 1½ inches. The "Grafoil" was then perforated with a number of 5/32 inch holes.

The Grafoil was then laminated between two reinforcement layers—a polyethylene-graphite sheet and a clean polyethylene sheet—in a mold at 250° F., including 5 tons compression for 5 minutes, and cooled in a mold under 5 ton compression. The polyethylene-graphite sheet and the polyethylene sheet were each 7½"×5", and were arranged to leave a ½-inch border around the Grafoil, with the copper screen protruding about one-half from the laminate.

To form the cathode, 26.5 g. of the above-described mixture of activated carbon and polyethylene was ball milled for 2 hours, and trowelled onto the polyethylene-graphite side of a laminate placed in the mold. The mold was heated at about 350° F. in an oven for 15 minutes, removed from the oven and compressed under about 150 lbs. for 5 minutes to assure good electrical conductivity to the reinforcing layer, by causing the activated carbon particles to penetrate any clear polyethylene outer film formed during molding and cooled. An anode was prepared by sandblasting the polyethylene-graphite side of a laminate.

When immersed in electrolyte, the copper screen of both electrodes was entirely above the electrolyte.

FIG. 3 shows a charging circuit 70 consisting of a variable DC voltage source 72 connected in series, through switch 73, with the cell, and with an ammeter 74. The cell resistance, $R_c$, is shown as a separate circuit component, although, of course, it is actually within the cell and represents the sum of the total electrode and electrolyte resistances. Voltmeter 75 is connected in parallel with DC voltage source 72 and measures load voltage with switch 73 closed and the "open circuit potential" of the cell with switch 73 open.

Discharging circuit 80 is identical with charging circuit 70 except that DC voltage source 72 has been replaced by a variable resistor, $R_L$, and the poles of ammeter 74 has been reversed.

The cell was charged at a constant 2.5 amps, read on ammeter 74, by continually adjusting variable DC voltage source 72. During charging, since $V_c=iR_c+E_c=V_{dc}$, where $V_c$ is the voltage read on the voltmeter during charging, $R_c$ is the internal resistance of the cell, $E_c$ is the cell potential and $V_{dc}$ is the output of voltage source 72, the separation between the open circuit potential and the load charging voltage is a measure of the internal resistance of the cell. This internal resistance rises sharply toward the end of the charging cycle because the electrolyte molarity approaches and becomes less than 0.5 M in zinc bromide, below which the resistance of the zinc bromide electrolyte (or a similar divalent metal bromide electrolyte) solution increases rapidly. The potential of the cell, $E_c$, also rises more rapidly as full charge is approached due to local concentration gradients set up within the cell by virtue of the depleted electrolyte concentration.

At completion of the charging cycle, an aliquot portion of anolyte (electrolyte between the porous separator and the anode) was removed from the battery. The bromine content was determined by admixing the aliquot with an aqueous solution of potassium iodide, and determining the iodine content of the resultant solution by titration with a standard sodium thiosulfate solution using a starch indicator. The bromine content was thereby calculated to be 0.012 g./ml. of electrolyte, or a total bromine content of about 0.84 g. The zinc bromide concentration was determined from the specific gravity of the aliquot removed, which was 1.02 g./ml., indicating a zinc bromide concentration in the anolyte of about 0.115 M, or a total zinc bromide content of 1.8 g., of which about 1.3 g. represents bromine. Since, of 30 g. of zinc bromide, about 22 g. represents bromine, about 20 g. of bromine was calculated to be adsorbed in the activated carbon layer, an adsorptivity of about 0.8 g. per g. of activated carbon.

The battery was discharged at a constant 2 amps by adjusting variable resistance, $R_L$. The load voltage was read with switch 73 closed and open circuit potential with the switch open. Because local concentration gradients quickly disappear during discharge (due, e.g., to the increasing conductivity of the electrolyte), the open circuit potential initially decreases. Yet, the local voltage increases because, from: $V_d=iR_L=EAcell-iR_c$, the internal cell resistance, $R_c$, is decreasing more rapidly than is the potential of the cell. Finally, at full charge, both the load and open circuit potential decrease rapidly.

The rapid increase in the internal resistance of the cell as full charge is approached affords a signal that full charge is reached, which may be utilized, to, e.g., regulate a power source. This signal may be generated by a rapid increase in load voltage with time, or by an absolute precalibrated cell voltage value indicating full charge (e.g., 2.5 volts in FIG. 2).

In addition, even if the battery is overcharged, very little bromine in excess of that which can be adsorbed in the bromine-adsorbent layer will be formed. Hence, concentrations of free bromine which might otherwise, because of the high specific gravity of bromine, collect near the bottom of the battery, migrate to the anode, and dissolve electroplated zinc, will be avoided. If this were to occur, the dissolved zinc would replate out above the bromine-adjacent portions of the anode (because of the high resistance due to bromine). Further, at discharge, the effective area of the anode would be reduced, and hence also the load voltage. Repeated charge and discharge cycles would further aggravate the problem, until zinc growth near the upper part of the anode would become sufficient to traverse the battery to the cathode, causing shorting. By limiting the molarity of the electrolyte as described, however, the total effective area of anode (and cathode) remains the same, even after many charge and discharge cycles.

Other embodiments will occur to those skilled in the art.

What is claimed is:

1. A secondary battery system having an internal resistance characteristic capable of indicating when full charge is reached comprising a battery comprising an anode, a cathode including a bromine-adsorbent layer capable of adsorbing at least half its weight of molecular bromine when the battery is in the charged state, and an electrolyte comprising a divalent electroplatable metal bromide salt dissolved in aqueous medium, the amount of said salt being such that, when said battery is in the charged state, said electrolyte comprises less than 0.0005 moles/ml. of dissolved metal bromide salt and less than about 0.02 g./ml. of molecular bromine, and readout means for measuring said internal resistance characteristic to indicate when said battery is fully charged.

2. The battery of claim 1 wherein said bromine-adsorbent is activated carbon.

3. The battery of claim 1 wherein said salt is zinc bromide.

4. The battery of claim 3 wherein said electrolyte also includes a brightener.

* * * * *

UNITED STATES PATENT OFFICE
CERTIFICATE OF CORRECTION

Patent No. 3,640,771　　　　　　　　　Dated February 8, 1972

Inventor(s)　Ralph Zito, Jr.

It is certified that error appears in the above-identified patent and that said Letters Patent are hereby corrected as shown below:

Col. 2, line 13, change "polymethylene" to --polyethylene--;

Col. 3, line 41, delete "Dixon graphite" after the "(";

Col. 4, line 50, change "bromine" (2nd occurrence) to --bromide--;

Col. 4, line 66, change "EAcell" to --$E_{cell}$--.

Signed and sealed this 4th day of July 1972.

(SEAL)
Attest:

EDWARD M. FLETCHER, JR.　　　　　　ROBERT GOTTSCHALK
Attesting Officer　　　　　　　　　Commissioner of Patents